US005790176A

United States Patent [19]
Craig

[11] Patent Number: 5,790,176
[45] Date of Patent: Aug. 4, 1998

[54] MEDIA SERVER FOR SUPPLYING VIDEO AND MULTI-MEDIA DATA OVER THE PUBLIC SWITCHED TELEPHONE NETWORK

[75] Inventor: Bernard Jeff Craig, Nokesville, Va.

[73] Assignee: Bell Atlantic Network Services, Inc., Arlington, Va.

[21] Appl. No.: 416,016

[22] Filed: Apr. 3, 1995

Related U.S. Application Data

[63] Continuation-in-part of Ser. No. 910,395, Jul. 8, 1992, abandoned.

[51] Int. Cl.$^6$ ................................................ H04M 11/00
[52] U.S. Cl. ................................ 348/13; 348/7; 455/6.3
[58] Field of Search ................................ 348/13, 6, 7, 12; 379/105, 96, 93.25, 93.17, 102.02, 102.03; 455/3.1, 4.1, 4.2, 5.1, 6.1, 6.3

[56] References Cited

U.S. PATENT DOCUMENTS

| | | |
|---|---|---|
| 3,766,324 | 10/1973 | Budrys et al. |
| 4,164,767 | 8/1979 | Gyi et al. |
| 4,214,285 | 7/1980 | Land |
| 4,332,980 | 6/1982 | Reynolds et al. |
| 4,381,522 | 4/1983 | Lambert |
| 4,506,387 | 3/1985 | Walter |
| 4,513,390 | 4/1985 | Walter et al. |
| 4,518,989 | 5/1985 | Tabiki et al. |
| 4,533,943 | 8/1985 | Poirier |
| 4,538,176 | 8/1985 | Nakajima et al. |
| 4,569,026 | 2/1986 | Best |

(List continued on next page.)

OTHER PUBLICATIONS

H. Armbruster et al., "Broadband ISDN: Realization Aspects of the Future Telecommunications Infrastructure".
A.F. Bulfer, "Dial-A-View".
A.F. Bulfer, "A Trial of National Pay-Per-View Ordering and Billing System".
G. Domann, "BERKOM Test Network and BISDN/CATV Concept".
P.A. Polese et al., "Residential Subscriber System in a Broadband ISDN Environment".
M.L. Liou, "Visual Telephony as an ISDN Application".
H. Yasuda et al., "1/544–Mbit/s Transmission of TV Signals by Interframe Coding Systems".
H. Nikajima, "Enhanced Video Response System—VRS Phase II".
K. Haji, "Video Response System—VRS–".
British Patent Document No. GB 2 193 420 A.
"The Electronic Still Store: A Digital System for the Storage and Display of Still Pictures", by W.G. Connolly et al., SMPTE Journal, vol. 85, No. 8, pp. 609–613 (Aug. 1976).

Primary Examiner—Stella Woo
Attorney, Agent, or Firm—Lowe, Price, LeBlanc & Becker

[57] ABSTRACT

A media server receives, stores and forwards multi-media data and full motion video feature presentations within a public switched telephone network. The media server receives wide band digital video and MPEG encoded video signals. The wide band digital video is encoded using either a real-time MPEG encoding for immediate transmission over network facilities to subscribers or, using a multi-pass MPEG encoder for storage by the Media Server for subsequent transmission. The Media Server includes four levels of storage including DRAM, optical and magnetic disk storage, high speed tape storage and archival storage. A Librarian Processor allocates storage space on a media appropriate to retrieval requirements for the video data. The Librarian is responsive to a Storage Manager Processor and a Session Manager Processor for providing video program data to an Output Controller. The Session Manager Processor monitors all input, output and throughput of the Media Server and monitors all user initiated sessions. Interface with users for multi-media applications and interactive control of video presentations is over a packet data network, via an interactive processor which receives and decodes control data. A Multi-Media Application Processor supports multi-media applications resident on the Media Server.

36 Claims, 6 Drawing Sheets

U.S. PATENT DOCUMENTS

| | | |
|---|---|---|
| 4,635,136 | 1/1987 | Ciampa et al. . |
| 4,654,866 | 3/1987 | Bottle et al. . |
| 4,703,422 | 10/1987 | Kinoshita et al. . |
| 4,734,764 | 3/1988 | Pocock et al. . |
| 4,755,872 | 7/1988 | Bestler et al. . |
| 4,758,881 | 7/1988 | Laspada . |
| 4,761,684 | 8/1988 | Clark et al. . |
| 4,763,191 | 8/1988 | Gordon et al. . |
| 4,777,525 | 10/1988 | Preston, Jr. . |
| 4,792,849 | 12/1988 | McCalley et al. . |
| 4,797,913 | 1/1989 | Kaplan et al. . |
| 4,807,023 | 2/1989 | Bestler et al. . |
| 4,821,121 | 4/1989 | Beaulier . |
| 4,823,196 | 4/1989 | Goddard . |
| 4,829,372 | 5/1989 | McCalley et al. . |
| 4,835,604 | 5/1989 | Kondo et al. . |
| 4,843,471 | 6/1989 | Yazawa et al. . |
| 4,847,691 | 7/1989 | Barton et al. . |
| 4,849,811 | 7/1989 | Kleinerman . |
| 4,852,154 | 7/1989 | Lewis et al. . |
| 4,866,515 | 9/1989 | Tagawa et al. . |
| 4,868,866 | 9/1989 | Williams, Jr. . |
| 4,870,479 | 9/1989 | Dubner . |
| 4,888,638 | 12/1989 | Bohn . |
| 4,890,320 | 12/1989 | Monslow et al. . |
| 4,897,867 | 1/1990 | Foster et al. . |
| 4,941,040 | 7/1990 | Pocock et al. . |
| 4,949,187 | 8/1990 | Cohen . |
| 4,972,462 | 11/1990 | Shibata . |
| 4,974,111 | 11/1990 | Platte et al. . |
| 4,994,922 | 2/1991 | Goddard . |
| 4,995,078 | 2/1991 | Monslow et al. . |
| 4,996,714 | 2/1991 | Desjardins et al. . |
| 5,010,399 | 4/1991 | Goodman et al. . |
| 5,012,334 | 4/1991 | Etra . |
| 5,014,125 | 5/1991 | Pocock et al. . |
| 5,027,400 | 6/1991 | Baji et al. . |
| 5,130,792 | 7/1992 | Tindell et al. . |
| 5,132,992 | 7/1992 | Yurt et al. . |
| 5,172,413 | 12/1992 | Bradley et al. ............................ 455/3.1 |
| 5,220,420 | 6/1993 | Hoarty et al. . |
| 5,231,494 | 7/1993 | Wachob . |
| 5,247,347 | 9/1993 | Litteral et al. . |
| 5,371,532 | 12/1994 | Gelman et al. ............................ 455/4.2 |
| 5,410,343 | 4/1995 | Coddington et al. ................... 379/105 |
| 5,506,615 | 4/1996 | Awaji ........................................ 455/4.2 |
| 5,528,281 | 6/1996 | Grady et al. ............................. 455/4.2 |
| 5,528,282 | 6/1996 | Voeten et al. ............................ 455/4.2 |
| 5,550,577 | 8/1996 | Verbiest et al. .......................... 455/4.1 |
| 5,550,863 | 8/1996 | Yurt et al. ................................. 455/3.1 |
| 5,606,359 | 2/1997 | Youden et al. ............................. 348/13 |

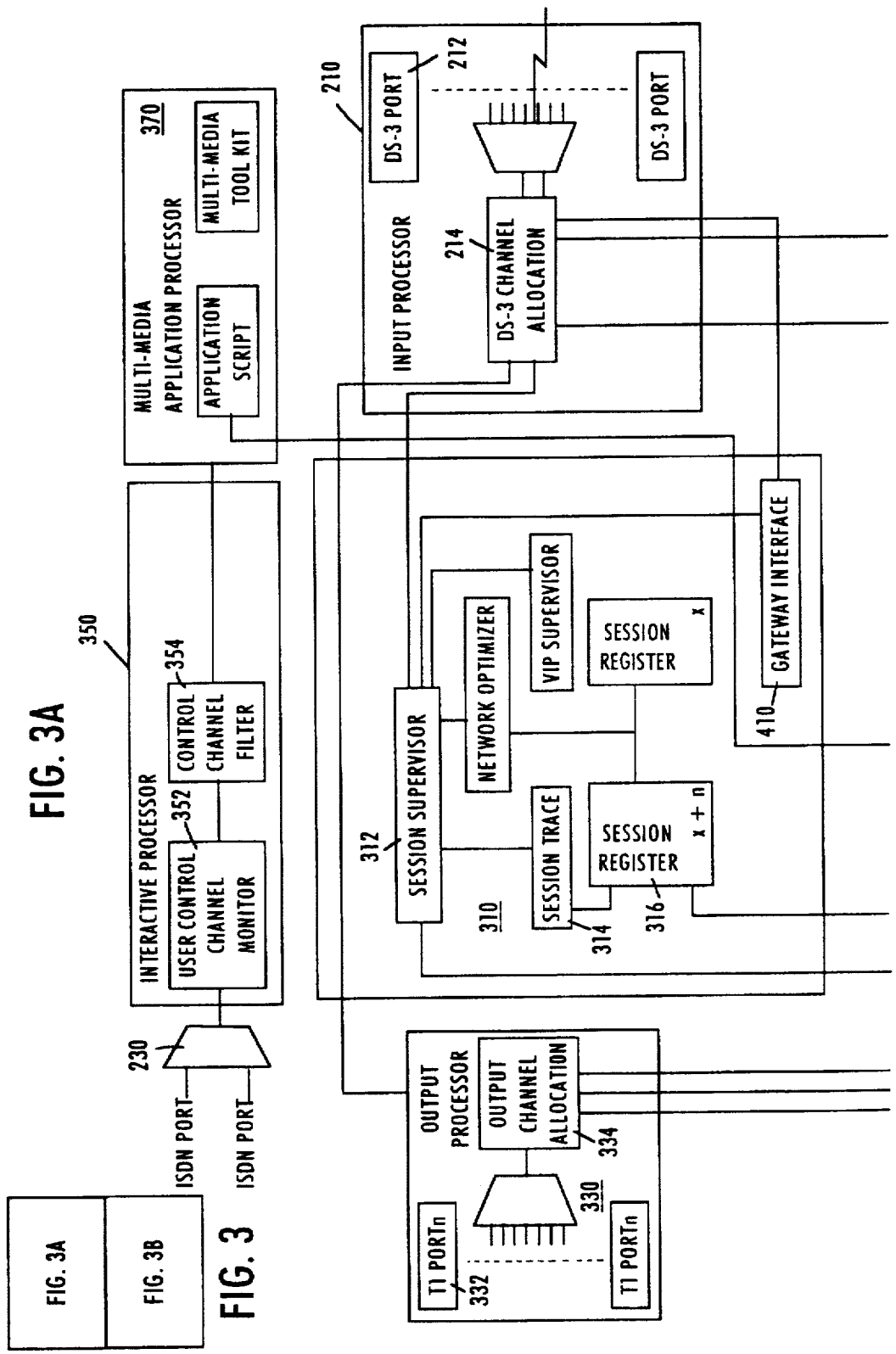

MEDIA SERVER FOR SUPPLYING VIDEO AND MULTI-MEDIA DATA OVER THE PUBLIC SWITCHED TELEPHONE NETWORK

This is a Continuation-In-Part Application of U.S. patent application Ser. No. 07/910,395, filed Jul. 8, 1992 abandoned.

TECHNICAL FIELD

The invention relates to a data storage distribution system using the Public Switched Telephone Network (PSTN), and, more particularly, to a media server for supplying stored image, video and audio data to local subscribers over a PSTN.

BACKGROUND ART

Video programming options have experienced rapid growth with advances in communications technology. Recent trends have been directed to user definition of programming, with each system subscriber specifying the programming to be provided. Such a system is described in related co-pending application Ser. No. 07/766,535, now U.S. Pat. No. 5,247,347 issued Sep. 21, 1993.

In addition to conventional full-motion video programs, advances in personal computer capabilities have created increased demands on data base sources to supply information to households and business. Corresponding increases in data availability, storage, retrieval and transmission capabilities have supported recent growth multi-media data presentation of information. Multi-media presentations include, in addition to conventional text, still-images, animation, slow and fast scan video, and graphics format visual presentations. Multi-media also includes sound data presented in concert with, or independent of, one or more of the listed visual presentations. A multi-media presentation can range from the equivalent of an electronic book including plain test in combination with still images to full motion video presentations of feature movies. Thus, multi-media spans a wide spectrum of data storage, retrieval and transmission requirements to present information in various formats to system users.

As described, multi-media includes full motion video presentations. Various systems have been suggested to selectively provide a user with requested video programming. These systems are sometimes referred to as programming-on-demand and impulse pay per view. Monslow et al. U.S. Pat. Nos. 4,890,320 and 4,995,078, respectively issued Dec. 26, 1989 and Feb. 19, 1991. These patents disclose a television broadcast system for real-time transmission of a viewer-chosen program at a viewer requested time to the requesting viewer's television receiver. The system comprises a program collection, which stores TV programs on a video tape. Each program is assigned and labeled with a catalog number.

A viewer request is transmitted using a conventional telephone over the PSTN to a scheduling computer. The chosen program is transmitted at the requested time over a broadband cable for viewing on the requesting viewer's television receiver. A control unit prevents other households connected to the cable from viewing the program.

Cohen U.S. Pat. No. 4,949,187 issued Aug. 14, 1990 describes a video communication system comprising a remotely controlled central source of video and audio data. This system allows home viewers to select from a choice of movies or other video and audio data that may be transmitted from the central source to be stored at the viewer's premises. The viewer can play the selection at any convenient time of his choosing. The central source may store the data digitally. Movies that need to be frequently accessed are stored on disks. Movies that are accessed only infrequently are archived. A distribution system CPU controls the bidirectional flow of data from both types of drives. Several movies can be transmitted simultaneously to different users through a plurality of input/output controllers. To make use of a single transmission media, such as a telephone line, a multiplexer is used, which may multiplex in the time domain or the frequency domain.

Etra U.S. Pat. No. 5,012,334, issued Apr. 30, 1991 discloses a video image bank for storing a plurality of video image sequences. The bank provides a visual effects set for video production. The bank includes a library of video disks with an associated library index. A microprocessor is loaded with the library index. Groups of still frames, one from each identified image sequence, are displayed and an operator selects any one of the represented image sequences for addition to an edit tape and associated edit list prepared by the bank.

Ciampa et al. U.S. Pat. No. 4,635,136, issued Jan. 6, 1987 discloses a massive inventory of labeled images, which are stored in a digital form. A TV signal for each image is generated by a video camera. Stored digital information defines the route for a video camera to each site where a video image is recorded.

Lambert U.S. Pat. No. 4,381,522, issued Apr. 26, 1983 discloses a cable television system which includes a plurality of selectable video signal sources having selectable television program material. The system enables a viewer to select desired program material available by telephone at a remote location and have the selected material promptly available for viewing. A minicomputer stores information on the program source location, the status of the selected program source, the available channels and the schedules for each.

Walter et al. U.S. Pat. No. 4,513,390, issued Apr. 23, 1985 discloses an information system for storage, retrieval and generation of information from a plurality of multi-media sources. The system uses a plurality of source inputs and a plurality of data outputs, all under the control of a common computer that is operative along a common data bus. Included as source inputs are stored memory data, hard copy, microfiche and direct operator entered data.

Pocock et al. U.S. Pat. Nos. 4,734,764 and 4,941,040, issued respectively on Mar. 29, 1988 and Jul. 10, 1990 disclose cable TV systems for distributing pre-recorded video and audio messages, which comprise a remote storage device. The video is presented as still frames, which are stored in a multiple node frame store. A video frame has one of the scan lines in its video blanking signal uniquely addressed.

Nakalima et al. U.S. Pat. No. 4,538,176, issued Aug. 27, 1985 discloses a video/audio transmission system, which sends video and audio information from video and audio files at a center to a subscriber through at least one subcenter having a video/audio buffer memory.

Walter U.S. Pat. No. 4,506,387, issued Mar. 19, 1985 discloses a programming-on-demand cable system, which allows any one of a plurality of users to request any one of a plurality of video programs from a library of programs. The programs are stored in memory devices selectable by a host computer at a central data station in response to an address signal transmitted from the user. Upon request of the viewers, the programs are transmitted at a high non-real-time rate over a fiber optic line network. Optical data is then reconverted to electrical data and stored for broadcast to the viewers.

McCalley et al. U.S. Pat. No. 4,829,372, issued May 9, 1989 discloses a presentation player which is utilized in a digital, interactive communication system accessible to a plurality of subscribers who can select any of a plurality of pre-recorded video/audio presentations for viewing on their TV sets. The system includes a large scale data base, which stores digital information including still frame images and textual information in hard disk memory units.

Beaulier U.S. Pat. No. 4,821,121, issued Apr. 11, 1989 discloses a still image store system, which stores and selectively outputs video image data. A random access frame store receives input video data converted into digital form and transfers the data to a disk store for more permanent storage. Full size data and reduced size data of the same video image are stored.

Bohn U.S. Pat. No. 4,888,638, issued Dec. 19, 1989 discloses a marketing research system for substituting stored TV programs for regularly scheduled, broadcast TV programs. The substitute TV programs may be transmitted from a central office via telephone lines to households of cooperating panelists for storage at the household premises.

While providing multiple data formats from a data base to a user, these prior art systems do not integrate network control functions to provide a high speed data link between major nodes narrow band encoded data from nodes to remote users. In particular, prior art systems are not responsive to individual user requests for providing high speed data connectivity from a data source to a node serving one or more users and selectively scheduling and supplying requesting users with programming.

Related copending application Ser. No. 07/766,535 filed Sep. 27, 1991 describes Video-On-Demand (VoD) Services that provide video programming to subscribers over the public switched telephone network (PSTN). A menu of video programming information is accessible at the subscriber's premises. The subscriber may transmit ordering information via the PSTN to independent video information providers. Video programming may be accessed and transmitted to the subscriber directly from a video information provider (VIP) or through a video buffer located at a central office (CO) serving the subscriber.

The VIP transmits coded digital video data over wideband PSTN supplied connectivity to a central office. The video data may be buffered at the central office for transmission over a POTS line to the subscriber. A subscriber may use either a standard telephone instrument over the PSTN or a dedicated control device over an ISDN packet network to order the video programming. Such a device is located at a television set of the subscriber and permits a display of the program menu on the television screen.

Connectivity between the central office and the subscriber for transmission of video data is provided by an asymmetrical digital subscriber line (ADSL) system. ADSL interface units perform frequency multiplexing of digital video information with voice information to be transmitted to the subscriber and support transmission on the ISDN packet data network of a reverse control channel from the subscriber to the central office.

However, the Video-on-Demand system does not include an integral library of video program material, nor does it support integration of several sources of programming material to provide a multi-media or mixed media presentation. The VoD buffer includes limited storage capabilities for video and audio data supplied by a VIP. Enhanced functionality is required to support multiple program storage and to integrate data from various data bases to provide composite programming required for multi-media and mixed-media presentations.

To support network management, a need further exists for a system which dynamically interacts with network facilities to reconfigure network resources in real-time and in response to information requests. A further need exists for a library system for accessing and retrieving multi-media programming from storage and from independent information providers in response to user requests and transmitting the data over wide bandwidth links to a node serving a user.

Accordingly, an object of the invention is to provide a library of multi-media data including video programming on demand using components of the PSTN.

Another object of the invention is to provide subscriber access to multiple sources of combined image and textual programming over the PSTN.

Still another object of the invention is to provide real-time subscriber control of multi-media and video programming delivery.

A still further object of the invention is to provide a selected video program to a subscriber within a predetermined short processing interval after initiation of a request.

DISCLOSURE OF THE INVENTION

According to one aspect of the invention, a media server for supplying multi-media data includes a user request processor responsive to a user request for supplying information request data. A session controller is responsive to the information request data for supplying information retrieval data and output control data. A data storage device is responsive to the information retrieval data for supplying program data. An output controller, responsive to the output control data, supplies the requested multi-media data. The multi-media data may include text, still images, graphics, low and high resolution partial and full motion video and audio.

The output controller includes transmission circuitry for transmitting the multi-media data to remote end users. According to a feature of the invention, a public switched telephone network is responsive to the output control data from the session controller for supplying the multi-media data to remote end users. The user request data is supplied to the user request processor means by the public switched telephone network.

According to another aspect of the invention, the user request processor includes a transmission receiver for receiving the user request data from a remote end user. The user request data is supplied to the transmission receiver by a public switched telephone network.

In accordance with another aspect of the invention, the data storage device includes a plurality of storage media for storing the program data. The data storage device may include both optical and magnetic memories and may further include three different storage media having substantially different respective information retrieval times.

According to a further aspect of the invention, session manager includes an output port selector responsive to the user request data for supplying output port assignment data and a memory for storing session status data. The memory includes a table for storing output port assignment data, input port assignment data, and program status data.

According to yet another aspect of the invention, the media server includes a program storage librarian responsive to the information retrieval data for supplying program priority data of respective program data, the data storage device responsive to the program priority data for storing the program data.

According to an additional aspect of the invention, a random access storage unit provides storage of the program data.

According to still another aspect of the invention, a program data input controller is responsive to the session controller for supplying real-time program data to the data storage device. A video data encoder receives the real-time program data and supplies encoded video program data to the data storage device and/or to the output controller for immediate distribution.

According to yet another aspect of the invention, the session controller includes session registers for storing dynamic frame location data indicating a current frame position of the program data. The session controller may further include a memory for storing a session routing table having program data routing data and program source data for active users.

According to a further aspect of the invention, the session controller is responsive to user address and file selection data for supplying network configuration request data. The user request processor may include security processor for storing user access data and, responsive to the user access data, selectively supplying the information request data to the session controller.

According a particular feature of the invention, the user request processor can detect a user control link failure. The user request processor may further include an audio response unit for receiving the user request data and for supplying audio responses to a requesting user and a program catalog processor responsive to the user request data for supplying the program catalog data to a requesting user.

According to another feature of the invention, the user request processor means supplies the user request data to a multi-media processing means for supplying information retrieval data to the data storage device.

The media file server system handles requests received from a Video Services Gateway and provides a video file feed to the customer via the network link. In addition to Video-on-Demand capability, the server supports other user highly interactive multi-media applications. The server is a file management system responsible for inputting video files from video and multi-media information provides storing these files or passing the real-time data through to the user, keeping track of the user's session, handling all interactive control requests from the user, and controlling all output to the user.

The system comprises an input controller, Q.931, X.25, T1 and DS-3 interfaces, a librarian, a storage manager, a session manager, an output controller, an interactive processor, and a multi-media application processor. The librarian provides file functions including distribution of video, audio, stills, and text selections to the session manager and the multi-media application processor at the request of itself and the multi-media application processor. The librarian keeps track of the storage location of all multi-media selections and catalogs and stores all incoming files from VIPs. The librarian records access history for determining statistical usage and trends. This information is used for, among other things, designating frequently used features for assignment to rapid access highly addressable storage.

Various storage modules of differing capacity and access speed are provided.

Storage format is MPEG encoded digital video, received from the VIPs, or D1 digital video, which is MPEG encoded by the server processor and stored in MPEG format. The processor provides appropriate interface with intelligent protocol.

The above and other objects, features and advantages of the present invention will become apparent from the following description taken in conjunction with the accompanying drawings.

BRIEF DESCRIPTION OF DRAWINGS

FIGS. 3, 3A and 3B are a detailed block diagram of a media server according to the invention.

BEST MODE FOR CARRYING OUT THE INVENTION

Figure 1:
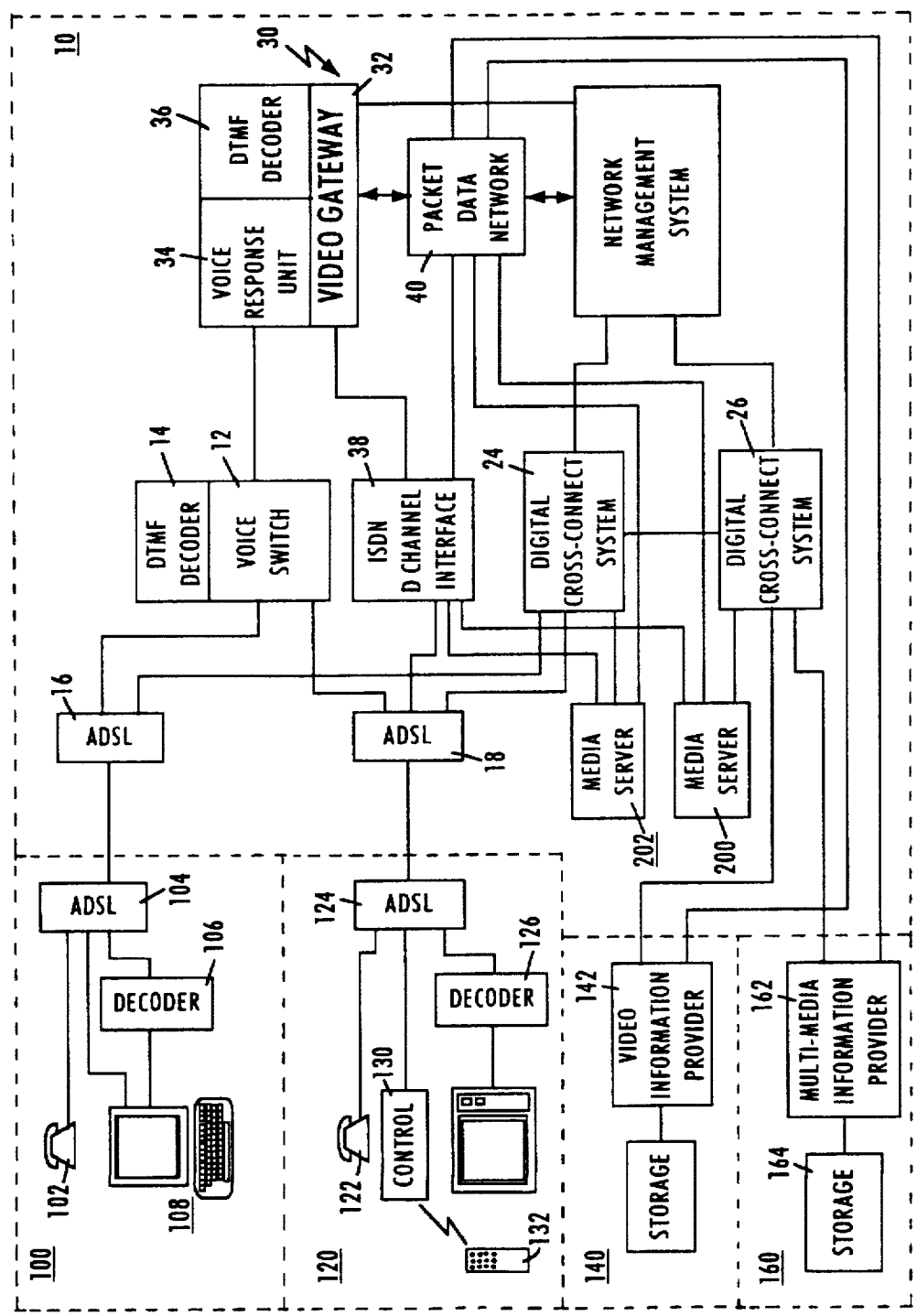
FIG. 1 is a block diagram of a multi-media programming distribution system including a media server according to the invention integrated in a public switched telephone network.

The overall Video-on-Demand and multi-media distribution service platform shown in FIG. 1 uses existing components of the Public Switched Telephone Network (PSTN). The system supports storage and distribution of conventional full motion video programs ("features") such as movies at user request, i.e., Video-on-Demand (VoD). Also supported are multi-media presentations and processing, including combinations of text, still images, and full and partial motion video. Video may include interactive activities such as training applications, games, shopping, etc.

The Media Server uses compression techniques to store video and other multi-media data in memory resources controlled by the Media Server for subsequent forwarding over interoffice facilities. The switching facilities are located in Central Offices (COs) serving residential customers or subscribers. Loop electronic devices modify the transmission characteristics of the local copper loop, to provide required enhancement to the PSTN and permit delivery of full motion video information and other media.

High data rate types of multi-media data are encoded to conserve system resources. For example, analog video information is first converted to a digital format using encoding algorithms standardized by the International Standards Organization (ISOs) Motion Picture Experts Group (MPEG). Each title comprises video information stored by the Media Server as an addressable data file in conventional data processing devices functioning as a video library. The function of establishing and monitoring connections linking a video library port transmitting selected information with the end user ports receiving the information is performed by a supervisory controller such as a network control system, e.g., FLEXCOM software, used to control the electronic digital cross-connect switches (DCS) in the PSTN. The DCS, also used for switching two-way DS-1 rate transmissions, is adapted to additionally provide bridging or broadcast of video information to several users. Data session control between a video library port and a remote user is one of the functions performed by the session manager of the Media Server.

The network control software of the Media Server in combination with management resources of the PSTN (i.e., FLEXCOM/LINC or other Network Management System) control the "network session" between an Output Controller of the Media Server, external program providers, and user ports. The session manager also maintains a record of relevant data regarding each session which is forwarded to a customer billing system.

Customer local loops equipped with Asymmetric Digital Subscriber Line (ADSL) devices are connected to the DCS. The multi-media distribution system provides for the simultaneous transport of a one-way 1.544 megabit per second (MBPS) signal over the same twisted pair transmitting voice messages to the residential subscriber. The ADSL transported signal is demultiplexed and the 1.544 portion is then decoded using MPEG standard techniques to deliver a full motion video signal. In the PSTN, fiberoptic technology will replace existing coaxial and twisted pair connectivity with corresponding enhancements made to switching and routing equipment.

Referring to FIG. 1, a multi-media system includes CO equipment 10 which is part of a PSTN. CO 10 provides connectivity from information providers 140 and 160 through the system to Media Servers 200 and 202 to multi-media subscriber 100 and VoD subscriber 120.

CO equipment 10 includes a conventional voice switch 12 which includes means to detect off-hook, service requests, call completion (i.e., ring trip), a DTMF decoder 14 and dial pulse detector. Voice switch 12 also includes an actual telephone call connection switch for routing voice circuits among the various ports. The CO equipment shown may be physically distributed over several sites.

Connected to voice switch 12 are ADSL equipment 16 and 18 for multiplexing (i) voice and signaling information from voice switch 12 and (ii) digital multi-media data from Digital Cross-Connect System (DCS) 24 onto respective subscriber local loops 20 and 22. Multi-media data from multi-media information providers 140 and 160 is provided to DCS node 26 where it is selectively supplied to Media Server 200 or immediately transmitted to DCS node 24 under control of Network Management System 28.

In addition to providing pre-stored video and multi-media programming, the Media Server accepts video and multi-media programming from video and multi-media information providers 140 and 160 for later transmission and for real-time and multi-pass MPEG encoding. Real-time encoding is used to provide encoded full motion video while minimizing network transmission requirements and providing a signal compatible with ADSL connectivity to subscriber premises 100 and 120. Multi-pass encoding performed by the Media Server provides a higher quality video signal for storage and later transmission over the network to subscriber premises 100 and 120.

ADSLs 16 and 18 multiplex data on subscribers loops 20 and 22 using frequency multiplexing, dividing the available loop bandwidth into three segments. Base band audio and signaling below 4 kilohertz (kHz) provides connectivity for a conventional telephone services available on the "plain old telephone system" (POTS). Alternatively, ISDN channel requirements consume the bottom 80 kHz of loop bandwidth. Reverse channel digital packet information is positioned between 80 and 90 kHz providing approximately 16 kilobits per second (kbps) connectivity from the subscriber premises to a packet switched network such as ISDN network over a D-channel interface. Compressed video and multi-media data is contained between 100 and 400 kHz to provide a 1.6 MBPS channel for transporting the video and multi-media data over respective loops 20 and 22 to customer premises 100 and 120.

Figure 2:
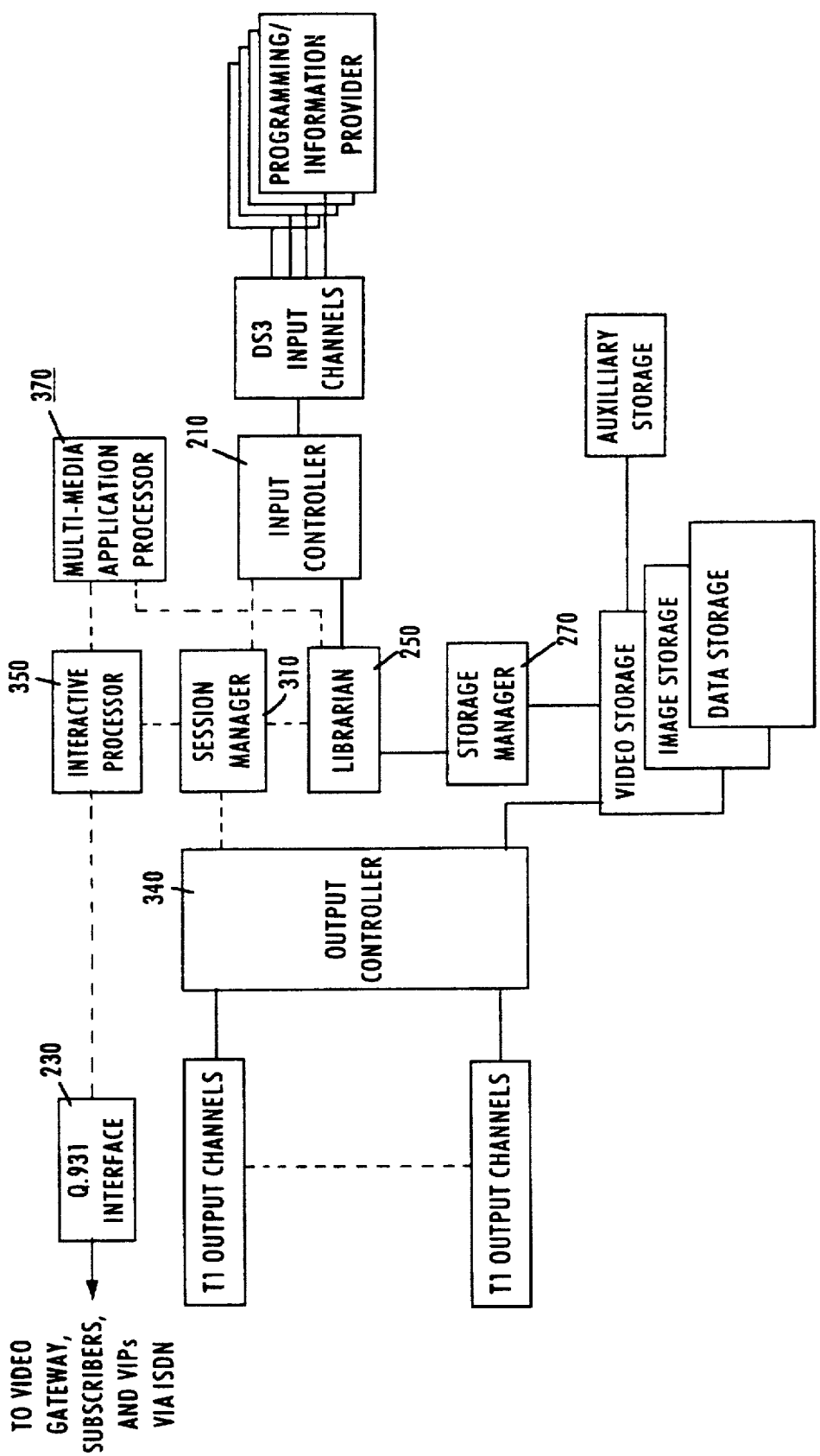
FIG. 2 is a simplified block diagram of a media server according to the invention.

The Media Server is shown in further detail in FIG. 2. The Media Server system processes all requests from Video Gateway 30 for providing multi-media and video file feeds to customer premises via the DCS and ADSL systems. The Media Server preforms input of video and other information files from Video multi-media information providers 140 and 160, stores these files or passes real-time data through to subscribers 100 and 120, monitors and records user sessions, processes all interactive control requests from users, and controls all output to the user.

The Media Server also processes and supplies multi-media services including interactive learning, interactive games, and other presentations. The Media Server stores and processes all data required for the multi-media applications including text, still pictures, audio, and partial and full motion video, as well as interactive application scripts.

The Media Server includes eight major component systems: Input Controller 210, Q.931 ISDN Interface 230, Librarian 250, Storage Manager 270, Session Manager 310, Output Controller 330, interactive processor 350 and multi-media application processor 370.

Input Controller 210 includes a plurality of DS-3 Input Ports 212 for receiving multi-media data including digitized video in the form of MPEG encoded digital video signals and unencoded video. D1 digital video is supplied to Librarian 250 for MPEG encoding. Video supplied in MPEG encoded format is supplied to Session Manager 310 for storage by the Media Server or for immediate transmission by output controller 330.

Q.931 Interface 230 provides connectivity between Interactive Processor 350 and ISDN D Channel Interface 38 (FIG. 1). Interactive Processor 350 receives command data over the ISDN from subscribers running interactive programming from the Media Server. Interactive programs include multi-media presentations and video games. Interactive Processor 350 also receives command data from subscriber control unit 130 for interactive control of feature presentations (i.e., conventional video programming including movies, concerts, etc.) including pause, fast-forward, reverse, and other "VCR" type capabilities supported by the Media Server. These latter commands are passed to Session Manager 310 for further processing and control of the video programming.

Data to be stored or retrieved from memory is first routed through Librarian 250 and, under its control, Storage Manager 270 either stores the program data or retrieves and provides previously stored program data to Output Controller 330.

Media Librarian 250 controls distribution of video, audio, still image data and text selections to Storage Manager 270 in response to information requests from Session Manager 310 and multi-media application processor 370.

Figure 3B:
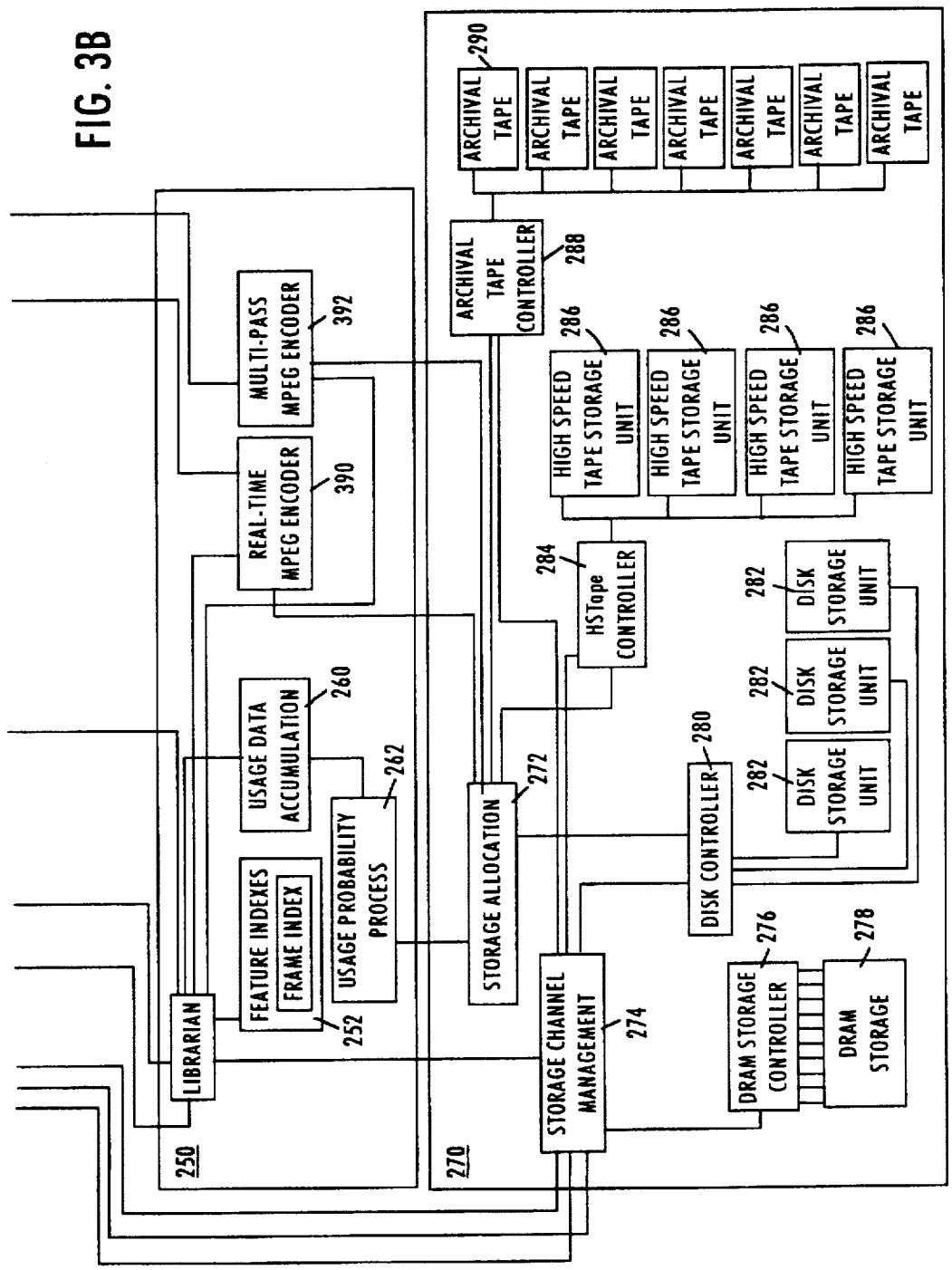

Referring to FIG. 3, the Librarian further monitors and record in Feature Index System 252 the storage location of all video selections for VoD and multi-media applications. The Librarian also records a history of access to-video programming, i.e., "features", and to other data provided during each twenty-four hour period in Usage Data Accumulation System 260. The usage data is supplied to Usage Probability Processor 262 to establish an intelligent cache using DRAM Storage 278 for rapid access and highly addressable storage of features.

Feature Index System 252 maintains a catalog of data and support processing for storing all locally stored programs. This includes the allocation of storage media type and space, maintenance of addressing tables for program status and frame indices, and maintain an index for all volumes. The program listing data is supplied to a menuing system supported by Video Gateway 30 (FIG. 1) via Packet Data Network 40.

Feature Index System 252 performs catalog maintenance functions including input of new feature program data into the system, ageing, and deletion or archival of aged program data. New program data from Video and Multi-Media Information Providers to be stored by the Media Server are received via a DS-3 port 212 of Input Controller 210. The catalog maintenance system determines the priority of the incoming program data and allocates appropriate storage to the data. Once the file space is allocated and the file is stored, the volume indexes are updated, the frame positions of the program are calculated and frame addressing tables are created and stored. The frame addressing tables are used to address a feature from any position in the feature.

When it is determined that a stored feature is no longer required, Media Librarian 250 removes the program data from the file catalog. The record to be deleted is then flagged by a system administrator of Storage Allocation Processor 272.

Librarian 250 tracks frequency of feature access. As a feature is requested less frequently, it is "aged" by the Media Server. Usage Probability Processor 262 assigns a priority value to the feature which is used to determine the appropriate storage type to maximize system resources while providing acceptable access time to the feature based on its demand history. Once a feature is aged to a point of not having been requested within a predetermined time period, the Media Server removes the program from on-line storage units 278, 282 and 286 and places it in archival storage 290. The feature header data remains stored in Feature Index 252, although access time for the feature will be increased.

The catalog system updates feature title data as the features are loaded into the Media Server. The updated catalog information is supplied by Librarian 250 of the Media Server to Video Gateway 30. The data supplied to the Video Gateway is shown in Table 1.

TABLE 1

| ELEMENT | USE | ORIGIN | TYPE |
|---|---|---|---|
| Feature Title | To be used by the menu system to update the list of features provided for the users. | Video information provider or programmer | |
| Feature Index Number | Used by the gateway when transmitting a request to the server. | Librarian | Alpha/Numeric |
| Priority | Used by the gateway to determine the set-up and wait time for a feature. | Originally determined by the feature box office ranking. Subsequently determined by the Trend processor. | Integer |
| Feature Length | Used for schedule processing by the gateway. | VIP/Programmer | |
| Key Actor/Actress, | Used by the Gateway for performing searches on | VIP | Array |

TABLE 1-continued

| ELEMENT | USE | ORIGIN | TYPE |
|---|---|---|---|
| Author, Director, Subject | the elements listed. | | |
| Motion Picture Association Rating | Used by the gateway for feature type blocking based on rating: G, PG, PG-13, R, NC-17, XXX | VIP | |
| Category | Used by the Gateway Menu processor to determine the placement of the title | VIP | |

Alternatively, according to a preferred embodiment of the invention, menu data is retained in the Media Server and downloaded to user customer provided equipment (CPE) for viewing and selection or transmittal to the user directly for processing.

Usage Probability Processor 262 statistically determines features having the highest probability of usage on a per hour and day of week basis to properly allocate high order storage, i.e., DRAM Storage 278, on an hourly basis. In support of this function, Usage Data Accumulation Memory 260 stores tables of data including time of viewing, day of viewing and cumulative number of requests that are updated each time a feature is supplied.

Figure 4:
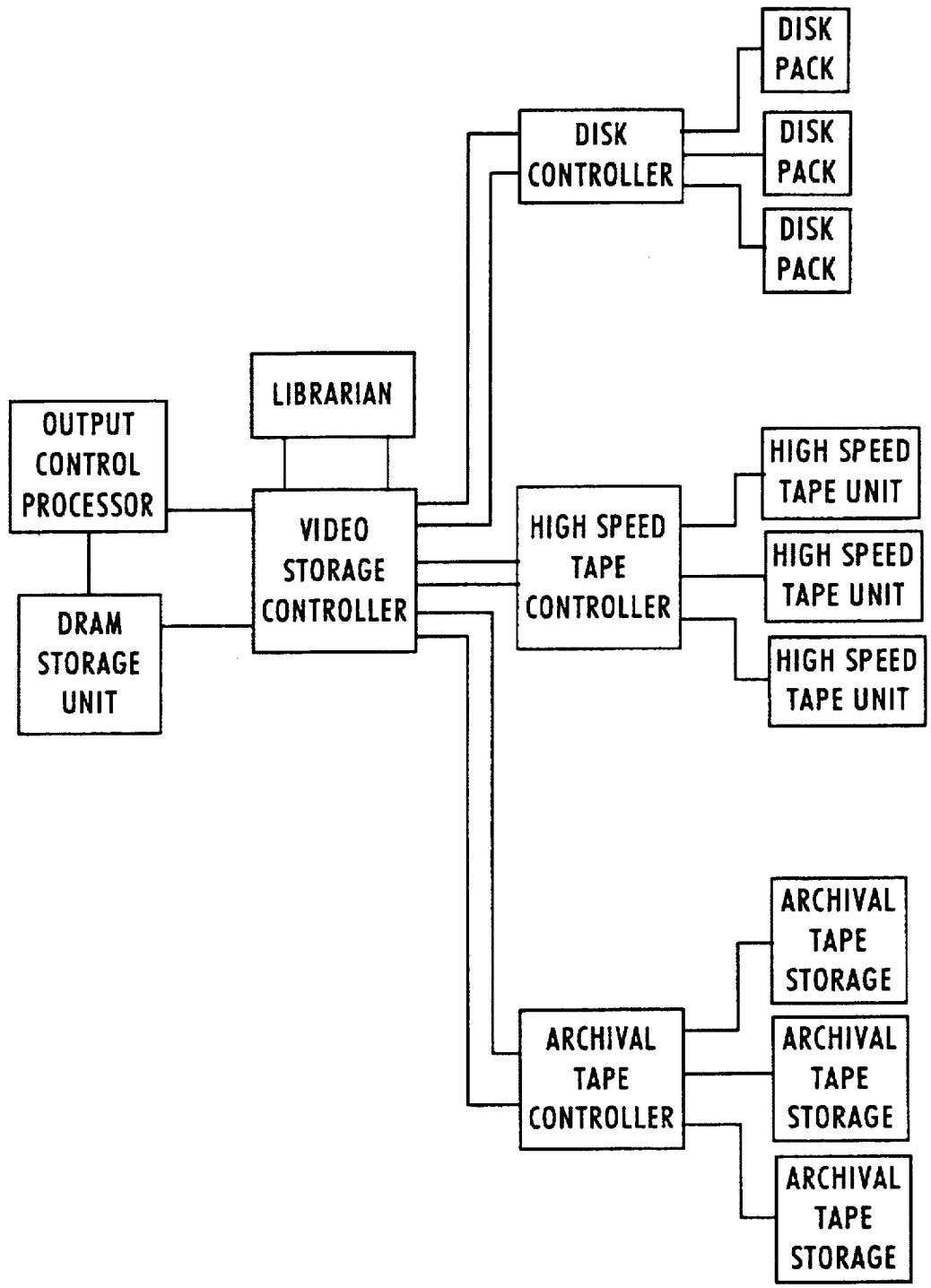
FIG. 4 is a block diagram of program storage facilities of the media server according to the invention.

Allocation of storage in the Media Server is based on the ranking of a feature and the output of the trend processing performed by Usage Probability Processor 262. Referring to FIG. 4, storage is divided into several components, including DRAM 278, Magnetic Disk 282, high Speed Magnetic Tape 286 and Archival Magnetic Tape 290. All features are stored on the appropriate media based on the priority ranking of the feature. For example, DRAM Storage 278 is used for the highest priority features as determined by the trend processing whereas Archival storage is used for the lowest priority features. Table 2 gives typical priority assignments and storage capabilities of each media.

TABLE 2

| PRIORITY | NUMBER OF FEATURES | STORAGE |
|---|---|---|
| 1 | 20 ± 5 | DRAM |
| 2 | 100 ± 20 | MAGNETIC DISK |
| 3 | 300 ± 50 | HIGH SPEED TAPE |
| 4 | 500 + | ARCHIVAL TAPE |

DRAM Storage 278 is used for the highest twenty features and data files as determined by the trend processing. When a feature or other high priority media file is stored in DRAM it does not occupy magnetic storage space until removed from DRAM storage. A compressed feature length movie of 90 minutes duration occupies approximately 1.2 gigabytes of DRAM storage.

Disk Storage Units 282 are fast access magnetic and/or optical media providing storage for the second highest fifty priority features and media data files as determined by the trend processing. When a feature is stored on a disk unit, it does not occupy DRAM or Tape Storage until removed.

Optical disks are especially efficacious since the capability now exists to both read and write from optical disks. Also, optical disks and disk readers are now quite inexpensive, permitting economic use of ever increasing arrays of data mediums. The optical reading devices are easily programmable (in the same manner as a commercially-available CD player) to read designated portions of the program contained upon the CD in a predetermined sequence. The redundant data inherent to optical disk use can be used as back-up data in a data stream transmitted from the optical disk to another storage device or an output processor that controls the data stream into the PSTN.

High Speed Tape Storage Units 286 store features and multi-media data files having a medium priority as determined by the trend processing. Finally, Archival Tape Storage is used for the lowest priority features and media data files.

Because of the high speed and extensive storage capacity of optical disks, they can be used in place of virtually any of the aforementioned memory device. Further, an array of optical disk readers can be used without the benefit of other memory devices, to provide the entirety of the program data to the media server supplying the video and multi-media data over the PSTN. At present the only real draw-back of optical disks is found in the expense of re-writing data to such disks, and the technical limitations making re-writing of data awkward.

Specific memory devices, either in the video information provider, the multi-media information provider or the media server can be dedicated or set aside for the benefit of specific subscribers for a time period longer than the duration of fulfilling a single program request. Such an arrangement would allow a subscriber to pre-select video programs to be transmitted to his or her premise at specific times without experiencing time delays inherent in the necessity of supplying the same program to as many users as possible simultaneously in order to avoid overloading the video data system. For the extra convenience, subscribers could pay a premium thereby justifying the dedicated use of a particular memory device.

Depending upon the usage of a particular memory device by a particular subscriber, there may be additional capacity in that memory device to accommodate dedication to more than one subscriber. A particularly effective method is the dedication of a memory device to a group of subscribers where the usage of that group represents the normal capacity of the memory device.

Depending upon the type of memory device requested by a subscriber, the price of the premium would be altered. For example, a fast cache memory using a DRAM dedicated to a single subscriber or group of subscribers would require a higher premium than an archival tape. To fully utilize the capabilities of the memory device, the subscribers would also have to have the capacity to download the contents of the DRAM into an on-site memory device capable of holding the entire contents of the desired program. Further, such a memory in the media server would have to be fed by a similar memory in the video information provider or the multi-media information provider in order to make optimum use of the memory device characteristics, as well as limiting the time during which the transmission channels were occupied. Thus, a DRAM in the media server is best serviced by the fast downloading from a DRAM in the video information provider.

The media server of the present invention has the capability of feeding through a program from an archival tape in the video information provider to the subscriber premises on a real-time basis. However, this is far from the most efficient use that can be made of the video data system of the present invention.

Since particular types of mediums can be selected by subscribers or groups of subscribers, and the system can operate in real-time, faster than real-time or slower than real-time, subscriber premiums can be adjusted accordingly. Thus, the priority that dictates the assignment of the fastest memory device can be based on criteria other than the frequency of program use. Another basis for assigning types of memory device would be to assign priority by program length. Thus, short information presentations would be handled by the fastest memory device while longer programs such as movies would be handled by the tape drivers or occasionally magnetic or optical disk. Also, programs-could be divided into long and short categories, each being prioritized according to the frequency of usage of a particular program within its category. Thus, some short programs could be prioritized so as to be handled by slower memory device than those handling some of the long programs.

Storage Channel Management Processor 274 controls flow of data between all storage devices and Output Control Processor 330. Input Controller 210 receives multi-media and feature program data from Video and Multi-Media Information Providers 140 and 160. Feature data input streams are accepted either as MPEG encoded digital video or as D1 digital video to be encoded by the Media Server. All data is either stored for play at a users request or passed directly through to the user as real-time programming. The storage channel management processor 274 also controls the allocation of specific memory devices in the media server to predetermine subscribers. As previously stated, this selection is made based upon input from the subscribers specifying a request for a specific type of memory. However, the control signals can be provided from the network management system which is preferably controlled by the network operator. Subscriber requests for particular types of services, such as dedicated memories of specific types, are made to the system management and provided to the media service from the network management system depicted in FIG. 1. The Session Manager 310 also supervises the selection of modes, such as real-time or one of the variety of compressed modes such as MPEG I or MPEG II. The selection of mode can be predicated upon a variety of factors, such as delays between requests for the same program, the frequency of program usage, and the length of the programs requested. Obviously, the selection of transmission mode can be programmed in a variety of ways, based upon any number of different combinations of criteria. One such criteria is the type of compression system used (if any) for transmission of the video frames.

The present system can accommodate MPEG I and MPEG II formats. MPEG I is a compression standard that delivers thirty frames per second (fps) of video data over limited bandwidth channel such as that of a CD-ROM. MPEG II is directed at broadcast television and has a corresponding bandwidth. For most movie scenes transmitted over the subject network, the background remains relatively stable while action takes place in the foreground. The background may move, but a great deal of the scene is redundant. The MPEG process starts its compression by creating a reference frame called an I or intraframe. These I frames contain the entire frame of video and are placed every ten to fifteen frames. Since only a small portion of the frames which fall between the reference frames are different from the rest of the reference frames, only the differences are captured, compressed and stored.

An MPEG stream is configured to have three types of pictures; an intra or I, as previously described; a predicted; and, a bi-directional interpolated. Intraframes provide entry points into the file for random access, but can only be moderately compressed. Predicted frames are encoded with reference to a pass frame (either an intra or a previously predicted frame), and in general will be used as a reference for future predicted frames. Predicted frames receive a fairly high amount of compression. Bi-directional pictures provide the highest amount of compression but require both a past and a future reference in order to be encoded. Bi-directional frames are never used for references. In operation, a reference picture is divided into a grid of 16×16 pixels squares called macro blocks. The subsequent picture is also divided into these same macro blocks. The controlling computer then searches for an exact, or near exact, match between the reference picture macro block and those in succeeding pictures. When a match is found, the computer transmits only the difference through what is called a vector movement code. The macro blocks experiencing no change are ignored, and thus the amount of data that must be compressed and stored is significantly reduced. After finding the changes in location of the macro blocks, the algorithm controlling the MPEG operation will further reduce the data by describing the difference between corresponding macro blocks. This is accomplished through a mathematical process called discrete cosine transformation or DCT. This process divides a macro block into four sub-blocks, seeking out changes in color and brightness.

MPEG encoded video data received at DS-3 port 212 of Input Controller 210 is routed to Session Supervisor 312 for storage by the Media Server or as flow-through to an appropriate output port 332 of Output Controller 330. Session Manager 310 supervises the data flow once connection from the Video Multi-Media Information Provider to the subscriber is established by Input Controller 210 and Output Controller 330. No data is stored and no index information is supplied to Librarian 250 in the case of flow-through data.

For non-encoded data, a simplified form of MPEG encoding is performed by Real-Time MPEG Encoder 390, requiring a latency of approximately ten minutes from data input to data output. Multi-Pass MPEG Encoder 392 is used for non-real-time processing, and provides full MPEG encoding of video data. Both MPEG encoders receive non-encoded video data from Input Controller 210 and provide encoded video to Storage Allocation Processor 272 of Storage Manager 270. The encoded video data is either stored in an appropriate storage media or transmitted by Storage Channel Management Controller 276 to Output Controller 310 for transmission to a subscriber over the PSTN.

Session Manger 310 include Session Supervisor 312 which manages all program sessions including system access by Video-on-Demand subscribers, other multi-media users and input and output to, from and through the Media server by Multi-Media Information Providers. Session Supervisor 312 tracks and records all data pertinent to each session including output port, input port (if receiving data directly from a Multi-Media Information Provider or if the user is a Multi-Media Information Provider), feature being played or multi-media application address, feature index data, feature frame data, and session condition. The Session Supervisor also performs network resource optimization by the simultaneous broadcast of the same feature over one output port to multiple subscribers. However, each subscriber session is individually managed to permit interactive features such as video pause.

Session Trace Processor 314 tracks each subscriber's session based on feature and frame so that the execution of a pause sequence can be managed for each individual session. A subscriber may start viewing a feature as part of a larger group, with a subsequent selection of a pause function placing the subscriber "out of sync" with the rest of the group. Once out of sync, a separate session is established for that user requiring Session Manager 310 to cause the Gateway to establish a new network link to the subscriber's viewing location. Note that, although each user is assigned an individual logical session, sessions remaining in sync with each other share output and network facilities.

Session Supervisor 312 maintains a matrix of routing information for each session, including what users are assigned to a given output port, and the source of the input data: Input Port number or local storage location in use. A file play clock uses the total number of frames in a given feature to estimate, by time, the frame position for that feature. This data is provided to the Session Registers 316 for tracking frames for each logical subscriber session and is used to restart an interrupted session. Session Manager 312 discontinues register updates upon detection of a session interruption. The Session Manger 312 receives requests for initial session establishment and for file retrieval from Gateway 30 via Q.931 Interface 230 and Control Channel Filter 354.

Interactive Processor 350 processes incoming commands from subscribers sites once a session is established by the Gateway. These commands include pause or like feature for Video-on-Demand, and all response and requests by multimedia work stations. The incoming data is interrogated for content and selectively forwarded to the appropriate module for processing: Session Manager 310 for Video-on-Demand and other retrieval applications and to Multi-Media Application Processor 370 for Multi-Media Applications.

Due to the requirements resulting from imaginative subscriber use of multi-media operation, elaborate manipulation of video program data is often demanded. In the very least, such operation would entail frequent stopping and starting of the video program at predetermined portions of the program, as well as repeating selected segments of the program. Such manipulations may be carried out at subscriber-selected points in the video program. Consequently, it is necessary for a subscriber to easily identify video frames.

The aforementioned use of frame indices is particularly helpful. By using these indices, a video program can be tracked on a frame-by-frame basis. As a result, the video program can be manipulated on the same basis so that a subscriber can indicate exactly where the program should be started or stopped, or which portions should be replayed. Such manipulation can be carried out in the same manner that a subscriber uses to order a program. As previously stated, the manipulation is facilitated through the use of a menu system such as those used in ordering goods or services over a credit network. The aforementioned frame-by-frame tracking and manipulation can also be used for selected copying and editing program material being stored at the subscriber terminal. This can be done using a special control unit such as element 130 in FIG. 1 or a personal computer such as element 108 in FIG. 1. The frame number or indication can be displayed in a periodic overlay, allowing a subscriber to locate a group of frames, and from that point to identify a specific frame.

Control Channel Monitor 352 monitors each subscriber's control channel to detect a communication failure. In the event of a failure, Session Manager 310 is informed and corrective action is initiated.

Referring to FIG. 1, dial-up access to the Media Server in the absence of dedicated Control Unit 130 is provided by voice switch 12 which establishes connectivity with VRU 34 which answers the incoming call. The VRU prompts the subscriber for a user ID which is input via the DTMF pad of telephone instrument 122. The user ID is checked and, if valid, the VRU prompts for a video selection. The video selection is then input using the DTMF pad of telephone instrument 102 which then sends the selection information to the Media Server via Video Gateway 32 and Packet Data Network 40. The Media Server identifies the requested title and determines if the title is available.

If the title is found, and has not been previously queued for transmission, the corresponding data file is opened and a reserve idle communications port is identified for transmission of the video data to an associated DCS node 24 or 26. Transmission of the data is delayed for a predetermined number of minutes in response to a first request for the video selection to allow for simultaneous transmission of the video data file to subsequent subscribers placing an order for the same title within the delay period. The subsequent request orders are also placed in the queue and the associated communications port ID is matched to the subscriber's network address.

After expiration of the predetermined delay, i.e., when current time equals the designated start time, the video data file is transmitted from Media Server through the DCS to the designated ADSL interface 18 for transmission to subscriber premises 120. At the end of the program, a message is transmitted by the Media Server to Network Management System 28 to take the system down by terminating DCS connectivity.

In an enhanced version of the Video-on-Demand system, subscriber premises 120 (FIG. 1) is provided with a control unit 130 for receiving data commands from remote control 132. Remote control 132 can be a conventional infrared remote control for interacting with control unit 130. Data from control unit 130 is provided to subscriber ADSL interface 124 for transmission of command data to ISDN D-channel interface 38. The ISDN D-channel interface can provide initial subscriber order information directly to video gateway 30 in lieu of using voice response unit 34. Once video gateway 32 identifies a subscriber request to establish connectivity with the Media Server, the address of control unit 130 is provided to the Interactive Processor 350 (FIG. 3). Upon receipt of the corresponding Interactive Processor network address by control unit 130, direct connectivity is established between control unit and the Media Server 200 or 202 over packet data network 40. This connectivity permits direct data transfer between the customer premises and the Media Server to support interactive video control used in interactive educational programming and interactive video presentations such as video games.

Control unit 130 also supports interactive control of the buffered video data by transmitting appropriate commands to Session Manager 310. These controls allow the subscriber to fast forward, rewind, forward, reverse search and pause the video/audio data provided via DCS 24 to the subscribers premises.

VRU 34 may additionally include voice recognition capability to support voice recognition security functions and voice selection of video programming.

Data reading and transmission errors can be critical in any video program provider. This is especially true if the data is compressed in one form or another. While the present invention can operate without data compression, avoidance of such errors is still critical to maintain the quality of the video programs received by the subscribers. Error removal or fault tolerance can be provided by redundant array of inexpensive disks (RAID) containing redundant data. With this system, if one of the disk drives fail, no data is lost, since all of the data exists on other disks. The defective drive can be replaced and the data that was stored on it is reconstructed onto the replacement drive. However, this system does not optimally use all of the capacity of the memory device available to it. A more effective method is found in the data striping technique depicted in FIG. 5.

Figure 5:
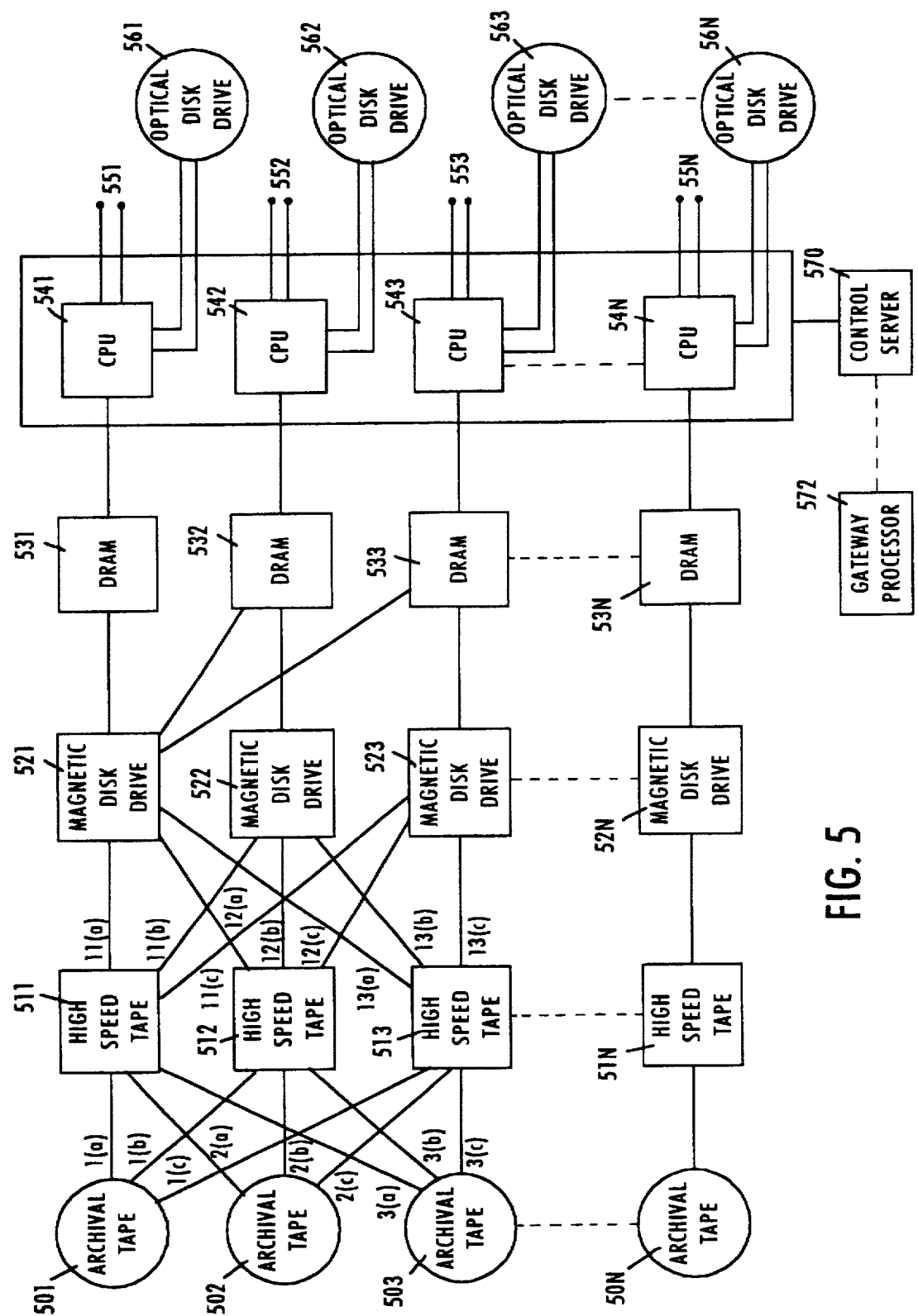
FIG. 5 is a block diagram of program storage facilities of the media server illustrating data block distribution based upon the data striping technique of the present invention.

Two arrangements for carrying out data striping are illustrated in FIG. 5. The first arrangement is on the left hand side of the controller cluster including 541, 542, 543 . . . 54N. And the other arrangement is located on the right hand side. For purposes of this discussion, elements 501, 502, 503 . . . 50N can be considered archival, or slow tapes. Elements 511, 512, 513 . . . 51N can be considered high speed tapes, while elements 521, 522, 523 . . . 52N can be considered disk drives. Finally, elements 531, 532, 533 . . . 53N are DRAM memory elements, generally used as memory caches. Each horizontal line of memory devices is controlled by a CPU such as 541, 542, 543 . . . 54N.

The data output as controlled by each respective CPU is provided at a pair of output terminals 551, 552, 553 . . . 55N for each CPU 541 . . . 54N. These output pairs are preferably Small Computer Systems Interfaces (SCSI). This is a general purpose parallel interface standard for connecting one or more computer peripherals. The present invention will also accommodate SCSI-II interfaces. These are 16-bit implementations using known SCSI commands. This interface is capable of transferring data at rates up to 10 megabytes per second. The overall output from the combined CPUs 541, 542, 543 . . . 54N is controlled by control server 570.

Control server 570 operates to control and coordinate the data flow from each of the outputs 551, 552, 553 . . . 55N. The connection between control server 570 and central processors 541, 542, 543 . . . 54N is preferably an Ethernet connection. Control server 570 is connected to gateway processor 572 via an Ethernet connection. Preferably the gateway processor is attached to the rest of the network via a 56 KB x.25 data link. This processor keeps track of all legitimate subscribers and manages validation for instructions received by the subscribers. Gateway processor 572 also keeps maps, as well as subscriber profiles. When a call comes from a subscriber to view a particular movie, the request passes through the gateway processor 572. This processor has the capability of receiving responses in DTMF from subscribers so that such requests can be forwarded to the control server 570. It is noted that the connection between the gateway processor 572 and the rest of the network to facilitate receipt of subscriber requests can be carried out in the same manner as used for the previously described media server. Further, the gateway processor can use an attached voice response unit as well as a DTMF decoder as previously described with respect to video gateway 30 in FIG. 1 of this application.

Requests from gateway processor 572 are sent over the Ethernet connection to control server 570, which then assigns appropriate data outputs to service the subscriber. Once an assignment of a particular output is made to a particular subscriber to provide a particular video program, a timer is started so that anyone else requesting the same video program within a predetermined length of time can be included to receive the program output from the selected output connection. As additional subscribers request the same program within the predetermined time period, supplemental commands are sent to the various network switching elements, such as the digital cross-connection system 24 (in FIG. 1) so that additional users can be provided from the same data stream from the selected output pair.

The combination of the control server 570, the gateway processor 572 and the array of memory devices can be referred to as interactive multi-media television, multi-view platform (IMP), and is generally referred to as a data pump. Such data pumps can be used on site with a video information provider 142 (in FIG. 1) or a multi-media information provider 162 (in FIG. 1), as well as with a media server as previously described.

Any number of parallel outputs 551, 552, 553 ... 55N can be provided. For example, for a given data pump such as that depicted in FIG. 5, 50 SCSI outputs are contemplated. However, the outputs can be multiplexed in any number of different arrangements to provide a data stream or streams consisting of data output provided by the SCSI output pairs 551, 552, 553 ... 55N. The data stream resulting from the aforementioned data pump is controlled in timing and content by control server 570 which instructs CPUs 541, 542, 543 ... 54N to control the data striping process among each of the various types of memory device contained in the aforementioned data pump.

The resulting data stream is constituted using a data striping method in which portions of a single program contained in the first type of memory device, such as 501, are distributed over a plurality of different memory devices 511, 512, 513 ... 51N of a second memory type (preferably having higher operating speed than the first memory type). As depicted in FIG. 5, portions of single programs contained on one, some or all of the memory devices 501, 502, 503 ... 50N are apportioned among a plurality of memory devices 511, 512, 513 ... 51N of the second type. For illustrative purposes, the first type of memory device can be considered an archival or slow speed tape while the second type of memory device can be constituted by high speed tape drives.

Using this technique, the loss of one memory device such as 511 does not wipe out an entire program accessed from archival tape 501. Using well known conventional techniques such as interlacing, the portions of program from a failed memory device can be reconstituted using portions of the same program from other memory devices. Depending upon the length of the program segments apportioned among the plurality of memory devices, an interlacing technique may not be particularly effective. However, program segments can be repeated in different memory devices. For example, the program portion transmitted between memory devices 501 and 511 via data stream 1(a) can be repeated in a plurality of memory devices by transmitting the same segment from memory device 511 to memory devices 521, 522 and 523 via data streams 11(a), 11(b) and 11(c), respectively. Such repetition is optional depending upon program size and the emphasis placed by the system operator on reliability or the popularity of a particular program.

Repetition need not be carried out on a one-to-one basis between memory devices 511, 512, 513 ... 51N and 521, 522, 523 ... 52N. Rather, the program segments may simply be further redistributed between the second type of memory device (511 ... 51N) and the third type of memory device (521 ... 52N). For purposes of the example depicted in FIG. 5, the third type of memory device can be a magnetic disk drive. Because of the speed of such drives (in comparison to that of high speed tapes) repetition of program segments is more feasible in terms of timing efficiency than would be possible with tape drives.

The fourth type of memory device, depicted by 531, 532, 533 ... 53N, is a DRAM cache memory. This is the fastest type of memory available and also the most costly for storing large amounts of information. The contents of the third type of memory device represented by 521 ... 52N, can be fed directly into corresponding memory devices of the fourth type (if they are capable of storing the entirety of the program material in a single memory device such as 521, or, the data from memory device 521 can be distributed in segment at fashion over a plurality of the fast DRAM devices represented by 531 ... 53N). While using this technique, a system operator can create a data stream flowing from the data pump depicted in FIG. 5 that is constituted by a mixture of program segments that best suits the subscriber demands made upon the media server or video information provider.

It is noted that the system operator has the option of repeating segments more often for some programs than for others. The operator further has the option of transmitting some programs faster than others. This selection can be based upon the frequency of program demand by the subscribers, premiums paid by the subscribers, program length and even program type. For example, adult programs could be transmitted only during certain hours of the day.

While the first through fourth types of memory devices depicted in FIG. 5 are constituted by archival tape, high speed tape, magnetic disk and DRAM, respectively, this specific combination of memory devices is not necessary to carry out the data striping technique of the present invention. In the alternative, the first two types of memory device (501 ... 50N and 511 ... 51N, respectively) may be eliminated and only the magnetic disk (521 ... 52N) and the DRAM cache (531 ... 53N) used. The selection of such an arrangement would depend upon the amount of video program data being demanded by subscribers, the number of subscribers, the schedule of programs offered to subscribers and the overall size of the system being serviced.

In another alternative, optical disk drives such as those depicted by 561, 562, 563 ... 56N, could be substituted for the magnetic disk drives 521 ... 52N. If particularly fast magnetic disk drives are being used, the optical disk drives could be substituted for the high speed tape drives 511, 512, 513 ... 51N. Because the optical heads used to read optical disks can be programmed to select segments of a single program rather than the continuous reading of an entire program, each optical disk drives could be used to supply portions of a single program to a plurality of magnetic drives such as 521 ... 52N. These program segments can be passed on from the magnetic disk drive to a single DRAM such as 531, or each program segment can be passed onto a different DRAM such as 532, 533 ... 53N as depicted in FIG. 5. If such distribution of program segments is carried out by one of the magnetic drives 521 ... 52N, then each of the magnetic drives will distribute program segments over the plurality of DRAM memory devices 531 ... 53N. The distribution of program segments can be based upon that provided by the memory devices depicted as 511 ... 51N, or a re-apportionment or distribution can be affected by magnetic disk drives 521 ... 52N.

This segmentation of a single program can be applied to a plurality of different programs stored on a plurality of basic memory devices such as optical disks, high speed tapes or archival tapes. The complex rearrangement of program segments to suit the needs of a system operator or information provider is permitted by the earlier-described identification of each frame of the video programs. Because the video programs are easily scanned and identified, algorithms contained in control server 570 can select a number of frames for segmentation based upon the demands upon the information provider or media server. Such algorithms are known in the video data transfer technology, and are selected or adjusted depending upon the capacity and demands of the video provider system.

Yet another alternative is depicted in FIG. 5. On the right hand side of the block containing CPUs 541 . . . 54N, only optical disks are accessed to obtain video program data. Because the optical disk reading head can select predetermined program segments (under the control of a CPU such as 541, control server 570 can control the arrangement and timing of the segments of the various programs contained on optical disks read from readers 561 . . . 56N. Based upon subscriber demands sent through gateway processor 572, control server 570 configures the data stream constituted by segments from each of the programs contained in the optical disks being read.

The ultimate configuration depends upon the interface between the SCSI outputs 551 . . . 55N and the communication system conveying the video program data. For example, if multiplexing is being used with a limited number of interfaces with the communications network, control server 570 will have to configure the data stream accordingly. It is noted that the configuration of the video data stream will also depend upon the aforementioned time delays between subscriber demands and the time at which the demanded program will be transmitted to a plurality of subscribers over the communication network. The present data striping arrangement is flexible enough to be used in any number of different configurations. For example, the output of the data pump depicted in FIG. 5 could be a single data stream from a single output feeding a network or a media server.

On the other hand, an information provider may have a separate output for each media server contained within a communication network providing the video programs. It is also known that the multiplexing arrangement can be based upon any type known that will accommodate the bandwidth necessary for digital program data. This can include time division multiplexing, code division multiplexing as well as division of the existing bandwidth for a plurality of different program signals. In the alternative, the multiple SCSI outputs could be providing selected video data from a media server to a predetermined subscriber assigned to each output and thus memory device. Also, a media server could be providing a very limited number of outputs to a large number of subscribers.

In such a case when there are limited numbers of outputs of video programming and large numbers of subscribers to receive such programming, it is necessary that the data stream circulate through the system to be accessible to all of the subscribers. In the same manner, a video information provider can circulate a data stream to be accessible to a plurality of media servers within a communication system providing video data service, or even a plurality of communication networks providing such service. Delivery of the video program segment data stream to media servers is buffered by the packet data network 40 in FIG. 1. Consequently, scanning an identification of the video program segments for delivery to the media servers would not be a particular problem.

However, home subscribers do not have equipment exhibiting the efficacy of that contained in the packet data network or the media server. Consequently, selection of the proper program segments from the data stream can be highly problematical to the home subscriber. This is especially true if the video data is compressed so that real-time identification of the proper video frames is beyond the capacity of the home subscriber equipment. Further, information regarding the correct frames, even if they could be identified on a timely basis by the home subscriber equipment, is very difficult to provide to the home subscriber equipment so that the selection process can be carried out.

To avoid this drawback, a subscriber ordering a predetermined video program is provided with header information that accompanies the segments of the selected program. The header information is automatically fed into the home subscriber equipment so that the proper program segment can be identified and stored for viewing when the segment appears in the data stream at the home subscriber equipment. Such a header can accompany each segment of the desired program and is configured in a manner well known in this technology for the easy identification of a particular data stream.

It need not be necessary for each segment of the selected program to contain a header if subsequent segments of the selected program appear in the data stream on a synchronous basis. The synchronous time data can be sent along with the identification of the header from the media server to the home subscriber equipment. Once the header has been identified, the home subscriber equipment is capable of receiving and placing in memory only those program segments in synchronization with the appearance of the original header identifying the desired video program. Header data does not have to be read for each program segment. The synchronizing data sent to the home subscriber equipment would include the time delay between subsequent segments of the desired program, as well as the length of the segments to be copied.

The same process of selecting and storing particular program segments from the data stream can be carried out by a media server. If predetermined memory devices in the media server are dedicated to particular subscribers, then the media server can operate to allocate selected program segments to the memory devices assigned to the subscribers requesting those programs. This can be done for a plurality of subscribers having memory devices assigned to them, and is easily facilitated by selectively tapping the video program segments from the data stream. If high speed memories are available in the media server for such duty, while sufficient transmission capacity exists between the media server and the subscribers assigned to the memory devices and the subscriber home equipment has the capacity for high speed receipt and storage of data, the individual subscribers can select a download from the media server in a faster than real-time mode. The program segments would then be collected at the subscriber home equipment for viewing in a real-time mode when desired by the subscriber.

In the alternative, slower-operating memory devices could be used to download the selected video program segments from the media server to the individual subscriber assigned to a particular memory device in real-time if the high speed capacity did not exist in both the media server and the subscriber home equipment, or if the subscriber desired a real-time transfer of the video program data. Selection between the real-time mode for video program transfer or modes faster than or slower than real-time is preferably made at the option of the subscriber if the capacity exists within the media server, the communications network and the subscriber home equipment. Otherwise, the mode of transfer is dictated by the existing equipment limitations.

As previously discussed, if transfer of video program data is carried out in real-time or in a mode slower than real-time, identification on a frame-by-frame basis and manipulation of the program data on the same basis by the subscriber becomes feasible. However, if such manipulation is carried out at the media server based upon subscriber request, additional strain is placed upon the capacity of both the media server and the communications network between the media server and the home subscriber equipment. Such manipulation becomes extremely problematical when selecting program segments from the aforementioned data stream. Consequently, manipulation of program data on a frame-by-frame basis is best carried out at the home subscriber equipment.

Although the present invention has been described and illustrated in detail, it is clearly understood that the same is by way of illustration an example and is not to be taken by way of limitation, the spirit and scope of the present invention being limited only by terms of the appended claims. For example, MPEG encoding may be performed by an attached processor that is part of the server architecture. Further, each component of the server architecture may reside on a separate processing platform and be closely coupled by high speed application program interfaces (APIs).

I claim:

1. A data handling system arranged to provide multimedia data to one of a plurality of subscriber premises in a Public Switched Telephone Network (PSTN), servicing said plurality of subscriber premises and having means for circulating a data stream through said PSTN to be available to said plurality of subscriber premises, said data handling system comprising:
   (a) a digital cross-connect system responsive to control data for establishing conductivity between a multimedia data base and said plurality of subscriber premises;
   (b) a plurality of programs designated for transmission to said plurality of subscriber premises, each program being divided into a plurality of program segments;
   (c) a memory array constituted by a plurality of memory types, each memory type having a different operating speed, said memory array comprising a plurality of memory devices of each said memory type, said plurality of memory types being arranged from a first to n'th level according to increasing operating speed;
   (d) first control means for distributing each program taken from a first memory type in sequential program segments over a plurality of memory devices of a second memory type having faster operating characteristics;
   (e) second control means for repeatedly distributing the same program segment from at least one of said plurality of memory devices of said second memory type to a plurality of memory devices of a third memory type, where each memory device of said second type provides program segments to said plurality of memory devices of said third memory type;
   (f) input control means for processing requests for said plurality of programs from said subscriber premises; and
   (g) output control means for providing an output data stream constituted by intermixed program segments from said plurality of programs.

2. The system of claim 1, wherein said output control means comprise means for multiplexing outputs of said memory array.

3. The system of claim 2, wherein said means for multiplexing is arranged to carry out time division multiplexing.

4. The system of claim 2, wherein said means for multiplexing is arranged to carry out frequency division multiplexing.

5. The system of claim 2, wherein said means for multiplexing is arranged to carry out code division multiplexing.

6. The system of claim 1, wherein said output control means comprise means for placing said output data stream in MPEG format.

7. The system of claim 1, further comprising a plurality of outputs, each providing an output data stream constituted by intermixed program segments of a plurality of programs from said memory array.

8. The system of claim 1, wherein said output control means comprise means for placing a data header at the beginning of each of said program segments, said header being indicative of a particular program to which said header is assigned.

9. The system of claim 8, wherein said output control means further comprise means for sending header data to a subscriber requesting a particular program, said header data being indicative of said header associated with said particular program requested by said subscriber.

10. The system of claim 9, wherein said output control means further comprise means for synchronizing time delay between transmission of subsequent program segments of said particular program requested by said subscriber.

11. The system of claim 10, wherein said header data includes data indicative of said time delay for said particular program.

12. The system of claim 1, wherein elements (b)–(g) are contained within a media server controlling transmission of said programs from said cross-connect system to said subscriber premises.

13. The data handing system of claim 12, wherein said output control means comprise means for altering said output data stream based upon subscriber requests correlated by said input control means.

14. The system of claim 1, wherein elements (b)–(g) are contained within a video information source providing said programs to said cross-connect system.

15. A data handling system of claim 14, further comprising a packet data network arranged between said video information source and said digital cross-connect system.

16. The data handing system of claim 1, wherein said output control means comprise means for altering said output data stream based upon subscriber requests correlated by said input control means.

17. A data handling system arranged to provide multimedia data to one of a plurality of subscriber premises in a Public Switched Telephone Network (PSTN), servicing said plurality of subscriber premises and having means for circulating at least one data stream through said PSTN to be available to said plurality of subscriber premises, said data handling system comprising:
   (a) a digital cross-connect system responsive to control data for establishing conductivity between a multimedia/video data base and said plurality of subscriber premises;
   (b) at least one multi-media/video data base comprising:
      (i) a plurality of programs designated for transmission to said plurality of subscriber premises, each program being divided into a plurality of program segments;
      (ii) a first memory array comprising a first plurality of memory types, each memory type having a different operating speed, said first memory array comprising a first plurality of memory devices of each memory type, said first plurality of memory types being arranged from a first to n'th level according to increasing operating speed;
      (iii) first control means for distributing each program taken from a first memory type in program segments over a plurality of memory devices of a second memory type having faster operating characteristics;
      (iv) second control means for distributing program segments from each memory device of said second memory type to a plurality of memory devices of a third memory type where each memory device of said second type provides memory segments to each memory device of said third memory type;

(v) first input control means for processing requests for said plurality of programs from said plurality of subscriber premises; and (vi) first output control means for providing an output data stream constituted by intermixed program segments from said plurality of programs;

(c) a media server comprising:

(vii) a second memory array comprising a second plurality of memory types, each memory type having a different operating speed, said second memory array being constituted by a second plurality of memory devices of each memory type, said second plurality of memory types being arranged from a first to n'th level according to increasing operating speed;

(viii) third control means for distributing each program taken from a first memory type in sequential program segments over a plurality of memory devices of a second memory type having faster operating characteristics;

(ix) fourth control means for repeatedly distributing the same program segment from at least one of said plurality of memory devices of said second memory type to a plurality of memory devices of a third memory type, where each memory device of said second type provides program segments to said plurality of said memory devices of said third memory type;

(x) second input control means for processing requests for said plurality of programs from said plurality of subscriber premises; and (xi) second output control means for providing an output data stream constituted by intermixed program segments from said plurality of programs.

18. The data handling system of claim 17, wherein said data handling system comprises a plurality of media servers, and said multi-media/video data base comprises a plurality of outputs, each providing an output data stream and being dedicated to a single one of said media servers.

19. The data handling system of claim 18, wherein each media server comprises a plurality of outputs, each output providing an output data stream where at least one of said plurality of outputs is dedicated to a single group of subscriber premises.

20. The data handling system of claim 19, wherein at least one of said plurality of media servers comprise means for selecting predetermined program segments from a data stream constituted by intermixed program segments of said plurality of programs from said memory array.

21. The data handling system of claim 20, wherein said means for selecting comprise means for receiving header data from said multi-media/video data base, said header data being associated with a program selected by a subscriber.

22. The data handling system of claim 21, wherein said plurality means for selecting further comprise means for recognizing said header data in said data streams.

23. The data handling system of claim 17, wherein said subscriber premises comprise:

(d) means for altering said output data stream based upon subscriber requests correlated by said first and second input control means;

(e) means for selecting predetermined program segments from a data stream constituted by intermixed program segments of a plurality of programs from said first and second memory array; and (f) means for receiving header data from said multi-media/video data base, said header data being associated with a program selected by a subscriber.

24. A process for creating a data stream composed of a mixture of program segments from a plurality of programs for use in a data handling system arranged to provide multi-media data to one of a plurality of subscriber premises in a Public Switched Telephone Network (PSTN) servicing said plurality of subscriber premises and having means for circulating at least one data stream through said PSTN to be available to said plurality of subscriber premises, said data handling system including at least one multi-media/video data base, and at least one media server arranged to distribute program data from said multi-media/video data base to said plurality of subscriber premises, said process comprising the steps of:

(a) selecting a plurality of programs from a plurality of memory devices of a first type;

(b) concurrently distributing a plurality of segments of a selected program to be interspaced with program segments taken from other programs;

(c) receiving input control signals; and (d) arranging program segments into a data stream responsive to said input controls signals;

wherein step (b) further comprises the sub-steps of:

(i) sequentially distributing program segments taken from a first memory device having a first operating speed into a plurality of memory devices having a second operating speed greater than that of said first memory device, and (ii) repeatedly distributing the same program segment taken from at least one of said plurality of second operating speed memory devices into a plurality of memory devices having a third operating speed greater than said second operating speed.

25. The process of claim 24, wherein step (b) further comprises the sub-step of:

(iii) sequentially distributing program segments from said plurality of third operating speed memory devices among a plurality of further memory devices having operating speeds greater than the third operating speed.

26. The process of claim 25, wherein step (b) further comprises the sub-steps of (iv) assigning a header to each program segment, and (v) sending indicia of said header to a customer requesting said program.

27. The process of claim 26, wherein step (b) further comprises the sub-steps of (vi) determining a time delay between subsequent program segments of the same program; and (vii) sending indicia of said time delay to said subscriber with said header data.

28. A system for providing data to at least one of a plurality of subscriber premises served by a public communications network comprising:

a digital cross-connect system responsive to control data for establishing conductivity between a data base and said plurality of subscriber premises;

said data base including a memory array comprising a plurality of storage components of varying access speeds arranged in a plurality of groups, the components of each group having similar access speeds, the group of lowest access speed components having stored therein complete programs;

first distributing means for sequentially distributing a plurality of segments of one of said programs among a plurality of first storage components of a higher access speed group;

second distributing means for repeatedly distributing the same program segment from at least one of said first storage components to a plurality of second storage components of higher speed than said first storage components;

accessing means for accessing in parallel the distributed plurality of program segments from the plurality of second storage components; and output control means for combining the parallel accessed program segments into a serial output data stream for output to said digital cross-connect system;

whereby said plurality of subscriber premises can receive the complete program at a real time rate.

29. A system as recited in claim 28, wherein said communications network is a broadband network.

30. A system as recited in claim 29, wherein said communications network is a public switched telephone network (PSTN).

31. A system as recited in claim 30, wherein said one program is a multi-media program.

32. A system as recited in claim 30, wherein said one program is a video program.

33. A system as recited in claim 28, wherein said output control means comprises a multiplexer.

34. A method for delivering programs in real time from a source of video or multi-media information through a digital cross-connect system and broadband communications network to subscriber premises, said method comprising:

storing complete programs individually in respective storage media having a first access speed;

sequentially distributing a plurality of segments of one of said programs among a group of a plurality of storage components of a second access speed faster than said first access speed;

repeatedly distributing the same program segment from at least one storage component of said second access speed group to a plurality of storage components of a third access speed faster than said second access speed;

accessing in parallel the distributed plurality of program segments from the higher access speed group;

combining the parallel accessed program segments into a serial output data stream; and feeding said output data stream to said digital cross-connect system;

whereby said subscriber premises can receive the complete program at a real time rate.

35. A method as recited in claim 34, wherein said communications network is a public switched telephone network (PSTN) and said step of combining comprises multiplexing said program segments into a common data stream.

36. A method as recited in claim 35, wherein said step of combining comprises multiplexing program segments from a plurality of individual programs into a common data stream for delivery respectively to a plurality of subscriber premises at real time rates.

* * * * *